United States Patent
Qin (10) Patent No.: US 9,917,913 B2
(45) Date of Patent: Mar. 13, 2018

(54) LARGE MESSAGE SUPPORT FOR A PUBLISH-SUBSCRIBE MESSAGING SYSTEM

(71) Applicant: LinkedIn Corporation, Mountain View, CA (US)

(72) Inventor: Jiangjie Qin, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 187 days.

(21) Appl. No.: 15/162,213

(22) Filed: May 23, 2016

(65) Prior Publication Data

US 2017/0339238 A1 Nov. 23, 2017

(51) Int. Cl.
*H04L 29/08* (2006.01)
*H04L 12/863* (2013.01)

(52) U.S. Cl.
CPC .............. *H04L 67/26* (2013.01); *H04L 47/50* (2013.01); *H04L 67/10* (2013.01); *H04L 67/2809* (2013.01)

(58) Field of Classification Search
CPC .............. G06F 17/30828; G06F 21/565; H04L 63/1416; H04L 47/36; H04L 69/22; H04L 67/26; H04N 21/2665; H04N 21/4314; H04N 21/4622
See application file for complete search history.

(56) References Cited

U.S. PATENT DOCUMENTS

| | | | |
|---|---|---|---|
| 6,910,054 B1 * | 6/2005 | Herbst | G06F 3/0607 |
| 2013/0260802 A1 * | 10/2013 | Mayblum | H04W 4/14 |
| | | | 455/466 |
| 2017/0063965 A1 * | 3/2017 | Grenader | G06F 9/4881 |
| 2017/0064027 A1 * | 3/2017 | Grenader | H04L 67/2842 |
| 2017/0242887 A1 * | 8/2017 | Zhao | G06F 9/5083 |
| 2017/0242889 A1 * | 8/2017 | Zhao | G06F 17/30457 |
| 2017/0371590 A1 * | 12/2017 | Rankovic | G06F 3/0659 |

* cited by examiner

*Primary Examiner* — Sargon Nano
(74) *Attorney, Agent, or Firm* — Park, Vaughan, Fleming & Dowler LLP (57) ABSTRACT

A system, apparatus, and methods are provided that support the passing of oversized messages within a publish-subscribe messaging system. During operation, the system subscribes to a message stream brokered by a message brokering cluster that imposes a maximum message size. Responsive to receiving a given message of the message stream, the system (1) determines an offset to commit to the message brokering cluster, wherein the determined offset is based on whether one or more segments of one or more oversized messages are buffered, and (2) commits the determined offset to the message brokering cluster. Responsive to recovering from a crash, wherein the offset at which to resume the receipt of messages from the message stream is unknown, the system then retrieves the determined offset from the message brokering cluster and resumes the receipt of messages from the message brokering cluster based on the determined offset.

20 Claims, 10 Drawing Sheets

100 System

110 Controller

Broker ... Broker

102 Message Brokering Cluster

Server ... Server

104 Message Producers

Server ... Server

106 Message Consumers

LARGE MESSAGE SUPPORT FOR A PUBLISH-SUBSCRIBE MESSAGING SYSTEM

BACKGROUND

Field

The disclosed embodiments relate to publish-subscribe message systems. More particularly, a system, apparatus, and methods are provided that support the passing of large messages within a publish-subscribe messaging system.

Related Art

Publish-subscribe messaging systems are often used by large organizations to direct the flow of data among a large number of machines (e.g., servers). Because messaging systems are usually constrained by bandwidth and memory limitations, the messaging system may be configured with a reasonable message size limit that can handle the vast majority of use cases without requiring an inordinate amount of resources.

There may be situations, however, where a data-generating process needs to deliver a chunk of data that exceeds the configured message size limit. One solution is to transfer the oversized data chunk by (1) copying the oversized data chunk to a secondary data store, (2) transmitting a message that includes a reference to the secondary data store via the messaging system, and (3) having the recipient access the reference to read the oversized data chunk. However, such an implementation would have more points of failure and more systems to maintain.

Hence, what is needed is a publish-subscribe messaging system that enables the transfer of large messages without the problems described above.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, flash storage, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method, apparatus, and system that support the passing of large messages within a publish-subscribe messaging scheme. During operation of the messaging scheme, a consumer process (i.e., a consumer), which executes on a particular computing device (e.g., a server located within a data center), subscribes to a message stream in order to receive a continual stream of corresponding messages (e.g., messages corresponding to discrete events) published by one or more producer processes associated with the stream (i.e., producers), which execute on one or more servers that are usually remote from the consumer. The publish-subscribe messaging scheme is brokered by a messaging brokering cluster that includes one or more servers (i.e., brokers).

Sending very large messages (e.g., ten megabytes or larger) to the message brokering cluster may unbalance the cluster and/or give rise to a memory and/or bandwidth shortage. Thus, the message brokering cluster may impose a maximum message size (e.g., one megabyte) that can handle the vast majority of use cases, wherein messages received by brokers that are larger than the maximum message size are rejected by the message brokering cluster. In some instances, however, a producer may need to send a message that is larger than the maximum message size. In this instance, the producer divides the oversized message into multiple smaller segments that can each be sent as an individual message that complies with the maximum message size. Each of the segments is sent by the producer to the message brokering cluster to be logged.

The message brokering cluster guarantees that messages of the message stream are logged in the order they are sent. Thus, at the message brokering cluster each message is assigned a sequential identifier (i.e., an offset) that uniquely identifies the message within its message stream or message stream partition. Segments of an oversized message, being messages in their own right, are assigned offsets in the same manner. Each oversized message is identified by the offset of its last segment (e.g., instead of by the offset of its first segment).

To avoid requiring a consumer to start reading from the beginning of a message stream in order to recover from a crash, during normal operation of the publish-subscribe scheme the consumer may periodically or regularly commit the offset of the message from which the consumer should resume reading after recovering from a crash. Thus, in some embodiments, when the consumer receives a given message from the message stream, the consumer determines, from metadata included within the given message, whether the given message is a segment of an oversized message.

If the given message is not a segment of an oversized message, the consumer determines whether any segments of one or more oversized messages are buffered (e.g., in an oversized message buffer that stores segments of oversized messages). If the buffer is empty, the consumer commits the offset of the next message that would arrive after the given message. Otherwise, if the buffer is not empty, the consumer commits the offset of the earliest or oldest buffered segment to ensure that, when the consumer resumes reading from the committed offset after a crash, no segments of any oversized messages are missed.

If the given message is a segment of an oversized message, the consumer determines whether the given message is the last segment of the oversized message. If the given message is the last segment, the consumer determines whether any segments of an oversized message different from the last segment's oversized message are buffered. If so, the consumer commits the offset of the earliest or oldest buffered segment. Otherwise, the consumer commits the offset of the next message that would arrive after the given message. If the given message is not the last segment of the oversized message, the consumer commits the offset of the earliest or oldest buffered segment.

Prior to receiving the last segment of the oversized message, for each segment of the oversized message that is received, the consumer buffers the segment in memory in an oversized message buffer of the consumer. When the last segment of the oversized message is received, the consumer retrieves the rest of the segments from the buffer and rebuilds the oversized message. The consumer then consumes the message.

Figure 1:
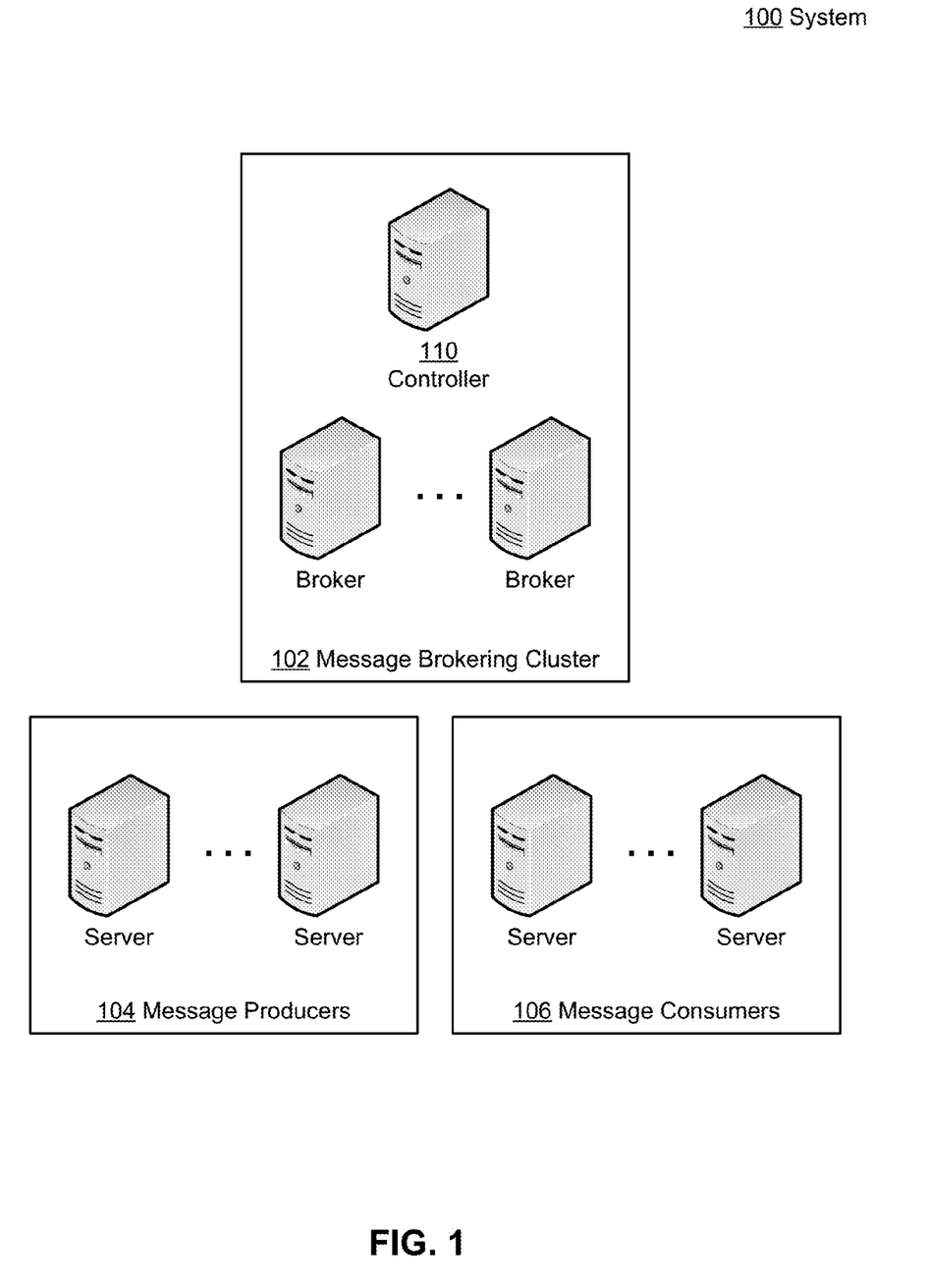
FIG. 1 shows a schematic of a system in accordance with the disclosed embodiments.

FIG. 1 shows a schematic of a system in accordance with the disclosed embodiments. As shown in FIG. 1, system 100 corresponds to one or more data centers associated with a software application and includes different components in different embodiments. In the illustrated embodiment, the system includes message brokering cluster 102, message producers 104, and message consumers 106.

Each data center may each house one or more machines (i.e., servers, computers) on which one or more instances of the software application are executed. The machines may be organized into one or more clusters of machines, such as message brokering cluster 102. In some embodiments, the total number of machines may number in the thousands, with each data center having many clusters and each cluster having many machines.

In general, machines in a given cluster may share common properties. For instance, each of the servers in message brokering cluster 102 (i.e., the brokers and controller 110) may execute at least one instance of a message brokering process that may cooperate and/or be coordinated with one or more other message brokering processes executing within the cluster.

In some embodiments, message brokering cluster 102 may correspond to a Kafka cluster. Kafka is a distributed, partitioned, and replicated commit log service that is run as a cluster comprised of one or more servers, each of which is called a broker. A Kafka cluster generally maintains feeds of messages in categories that are referred to as topics. Processes that publish messages (e.g., events) to a Kafka topic are referred to as producers, while processes that subscribe to topics and process the message feeds associated with the topics are referred to as consumers. In some cases, a topic may have thousands of producers and/or thousands of consumers.

At a high level, producers assign to their messages globally unique identifiers and send them over the network to cluster 102. Cluster 102 assigns the messages sequential offsets that identify their order in their corresponding topic(s), and logs the messages. Once logged, the messages may be fetched by consumers in sequence. As will be discussed below, each segment of an oversized message can be identified by the offset assigned by message brokering cluster 102, while the oversized message itself can be identified by the original message identifier assigned by the producer of the message. Therefore, a consumer can use the message identifier to aggregate all segments of an oversized message.

Message producers 104 include a set of servers, each of which executes one or more processes that produce messages (e.g., for Kafka topics) that are brokered by message brokering cluster 102. A given message producer may be responsible for choosing which message to assign to which partition within a Kafka topic (or other category of messages). When a message is received by the message brokering cluster, one of the cluster's brokers facilitates the delivery of the message to one or more message consumers 106 (i.e., makes the message available to be fetched). Message consumers 106 include a set of servers, each of which executes one or more consumer processes that subscribe to at least one of the Kafka topics or message categories brokered by the cluster.

Communication among the producers, consumers, and the message brokering cluster is done with a high-performance, language-agnostic Transmission Control Protocol (TCP) protocol. Messages may be written in various formats including JavaScript Object Notation (JSON) and Avro. For purposes of describing an illustrative environment, message brokering cluster 102 may be referred to herein as a Kafka cluster.

For each topic, the Kafka cluster maintains a log of messages that is divided into partitions. Each partition is an ordered, immutable sequence of messages that is continually appended to with messages received from producers (similar to a commit log). As indicated above, each message in a partition is assigned a sequential id number, known as an offset, which uniquely identifies the message within the partition. The Kafka cluster retains all published messages for a configurable period of time, regardless of whether they have been consumed or not. For example, if the Kafka cluster is configured to retain messages for two days, after a message is published, the message is available for consumption for two days, after which the message is discarded to free up space.

When a consumer initially subscribes to a Kafka topic, the consumer may begin reading from the beginning of the message stream (e.g., starting with the oldest messages in the topic that are still stored or otherwise available). If, at any time during the subscription, the consumer wishes to switch to a different part of a stream, the consumer may seek (i.e., perform a seek operation) to a particular offset within the message stream. After the seek operation is performed, the consumer resumes receiving messages, starting with the message identified by the particular offset.

If a consumer does not take steps to save its place in the message stream to which it subscribes, the consumer may be forced to start reading from the beginning of the message stream (e.g., the oldest stored message for the stream) after experiencing a crash—such as when the consumer process experiences a software crash or the underlying hardware fails. To enable consumers to avoid this scenario, the message brokering cluster may expose an interface that allows consumers to "commit" an offset to the cluster. Each time a consumer receives a message from a Kafka topic, or after some configurable number of messages or some configurable period of time, the consumer has the option of committing, to the message brokering cluster, an offset that indicates where the consumer should resume reading the message stream after recovering from a crash. After receiving a particular message, the consumer generally commits an offset of the next message that arrives right after the particular message (i.e., the particular message's offset incremented once) since the consumer has already received and consumed the particular message and does not need to do so again after recovering from a crash.

However, this behavior may change with the introduction of oversized messages into the message stream. Commit behavior in the presence of oversized messages is discussed in more detail with respect to FIGS. 2 and 3A-3B below.

Dividing a topic into multiple partitions allows the Kafka cluster to divide the task of handling incoming data for a single topic among multiple brokers, wherein each broker handles data and requests for its share of the partitions. On both the producer side and the broker side, writes to different partitions can be done in parallel. Thus, one can achieve higher message throughput by using partitions within a Kafka cluster.

For fault tolerance, each partition is replicated across a configurable number of brokers, wherein copies of a partition are called replicas. Each partition has one replica that acts as the leader (i.e., the leader replica) and zero or more other replicas that act as followers (i.e., the follower replicas). The leader replica handles all read and write requests for the partition while followers passively replicate the leader. If the leader replica fails, one of the follower replicas will automatically become the new leader replica.

Receiving very large messages (e.g., messages of ten megabytes or more) at the message brokering cluster may unbalance the cluster and/or give rise to a memory and/or bandwidth shortage. Thus, the Kafka cluster may be configured to accept messages up to a maximum message size (e.g., one megabyte). Although the maximum message size may be chosen to handle the vast majority of use cases, in cases where a producer needs to send a message that is larger than the maximum message size (i.e., send an oversized message), the producer splits the oversized message, which has a corresponding unique message id, into multiple segments that are smaller than the maximum message size and sends each of the segments individually, but with the same message id. Because each segment is a separate message to a broker or broker cluster, each segment is assigned a unique offset in accordance with the order in which the segments are sent within its Kafka topic partition, in addition to its message id.

In FIG. 1, controller 110 of message brokering cluster 102 is a broker that has been selected to manage the states of partitions and replicas and perform administrative tasks associated with the cluster.

Figure 2:
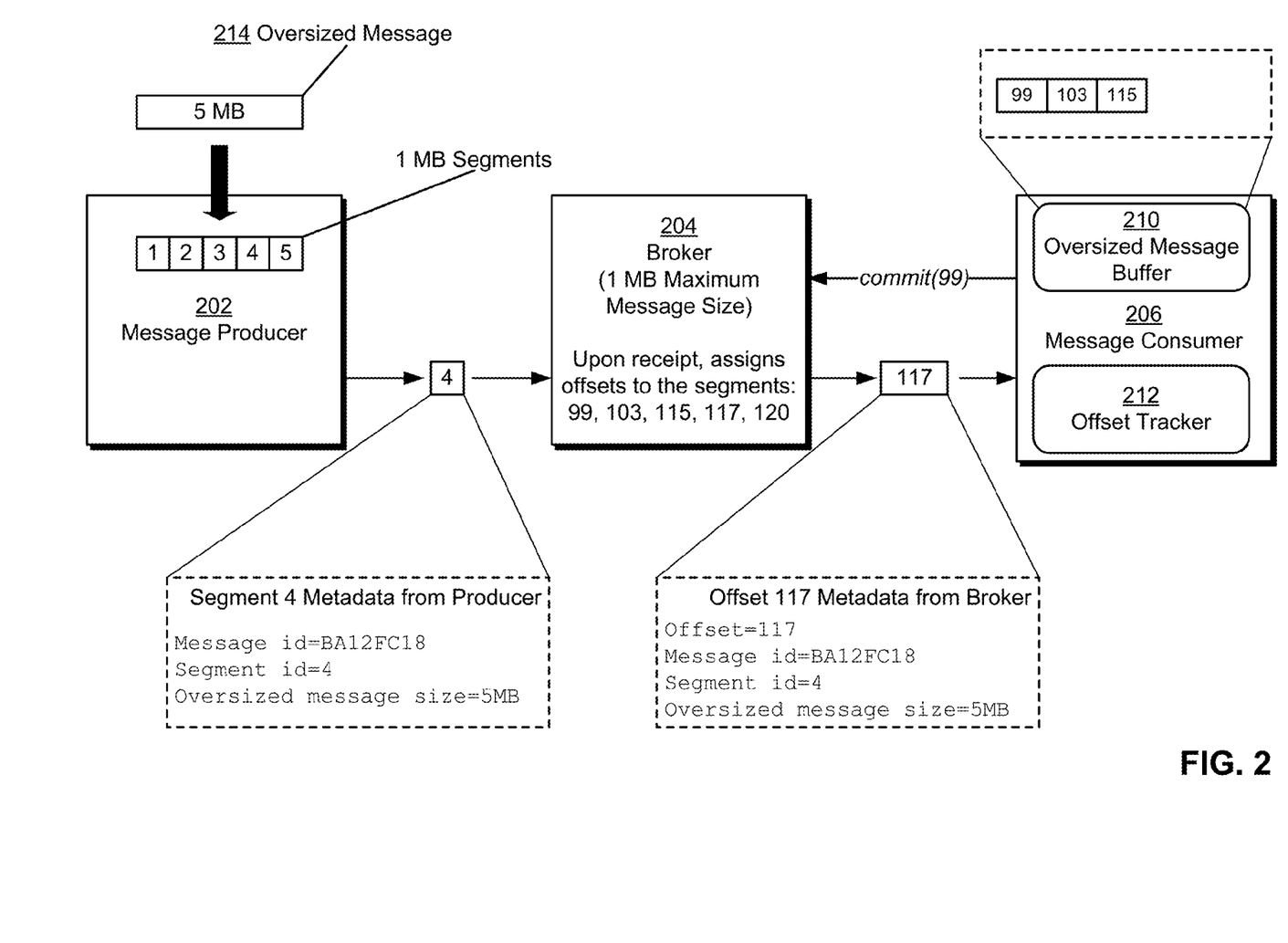
FIG. 2 shows a system that supports the passing of oversized messages within a message brokering cluster in accordance with the disclosed embodiments.

FIG. 2 shows a system that supports the passing of oversized messages within a message brokering cluster in accordance with the disclosed embodiments. More specifically, FIG. 2 illustrates the transfer of oversized message 214 from message producer 202, through broker 204, to message consumer 206, which comprises oversized message buffer 210 and offset tracker 212.

Message producer 202, which may correspond to a server in message producers 104 of FIG. 1, produces messages for a message stream that is brokered by broker 204, which may correspond to a broker within message brokering cluster 102 of FIG. 1. In particular, broker 204 receives messages produced by one or more message producers, including message producer 202, and stores the messages in a log for a period of time, thereby allowing message consumer 206, which may correspond to a server within message consumers 106 of FIG. 1, to fetch the logged messages in the order specified by their offsets.

To conserve memory and/or bandwidth, broker 204 may reject messages larger than one megabyte (MB). Therefore, when message producer 202 needs to transfer a message that is larger than one megabyte, the message producer divides the oversized message into multiple segments and sends each of the segments as individual messages to broker 204. Since segments are essentially messages, each segment will be assigned an offset in accordance with the order the segment is added to the message stream.

In FIG. 2, message producer 202 produces oversized message 214, which is five MB and is larger than the maximum message size established by broker 204 (e.g., one megabyte). Thus, message producer 202 divides oversized message 214 into five separate one MB segments identified as 1-5 in FIG. 2.

Metadata contained within each segment dispatched by producer 202 toward broker 204 may include information such as the unique message identifier assigned by the producer, the total size of the oversized message to which the segment belongs, the number of segments, the ordinal position of this segment within the oversized message's segments, message topic, etc. For example, and as shown in FIG. 2, the fourth of the five segments of oversized message 214 is being transferred from the message producer to the broker. Segment 4's metadata includes the identifier of the oversized message that it is part of (i.e., BA12FC18), an identifier of the segment (i.e., 4), and the size of the oversized message (i.e., 5 MB).

Upon receipt of each segment of oversized message 214, broker 204 treats the segment as a separate message, assigns it the next offset in the corresponding message stream, and sends it to consumer 206 or makes it available to be retrieved by the consumer. Thus, in FIG. 2, offset 117 is assigned to the segment.

When message consumer 206 receives or fetches a message, the message consumer first determines whether the message is a segment of an oversized message. In some embodiments, if the message includes a segment id within its metadata, the message consumer may conclude that the message is a segment of an oversized message. Next, based on the segment id, the message id, and/or other information (e.g., the size of the oversized message) the message consumer may determine whether the segment is the last segment of the oversized message. If the segment is the last segment, the message consumer may (1) retrieve other segments of the oversized message that are stored in oversized message buffer 210, (2) combine the other segments with the last segment to rebuild the oversized message, and (3) consume the oversized message. In some embodiments, consuming the message corresponds to presenting data contained within the oversized message to a user and/or forwarding the oversized message to be processed by a client application of the message consumer.

Figure 4A:
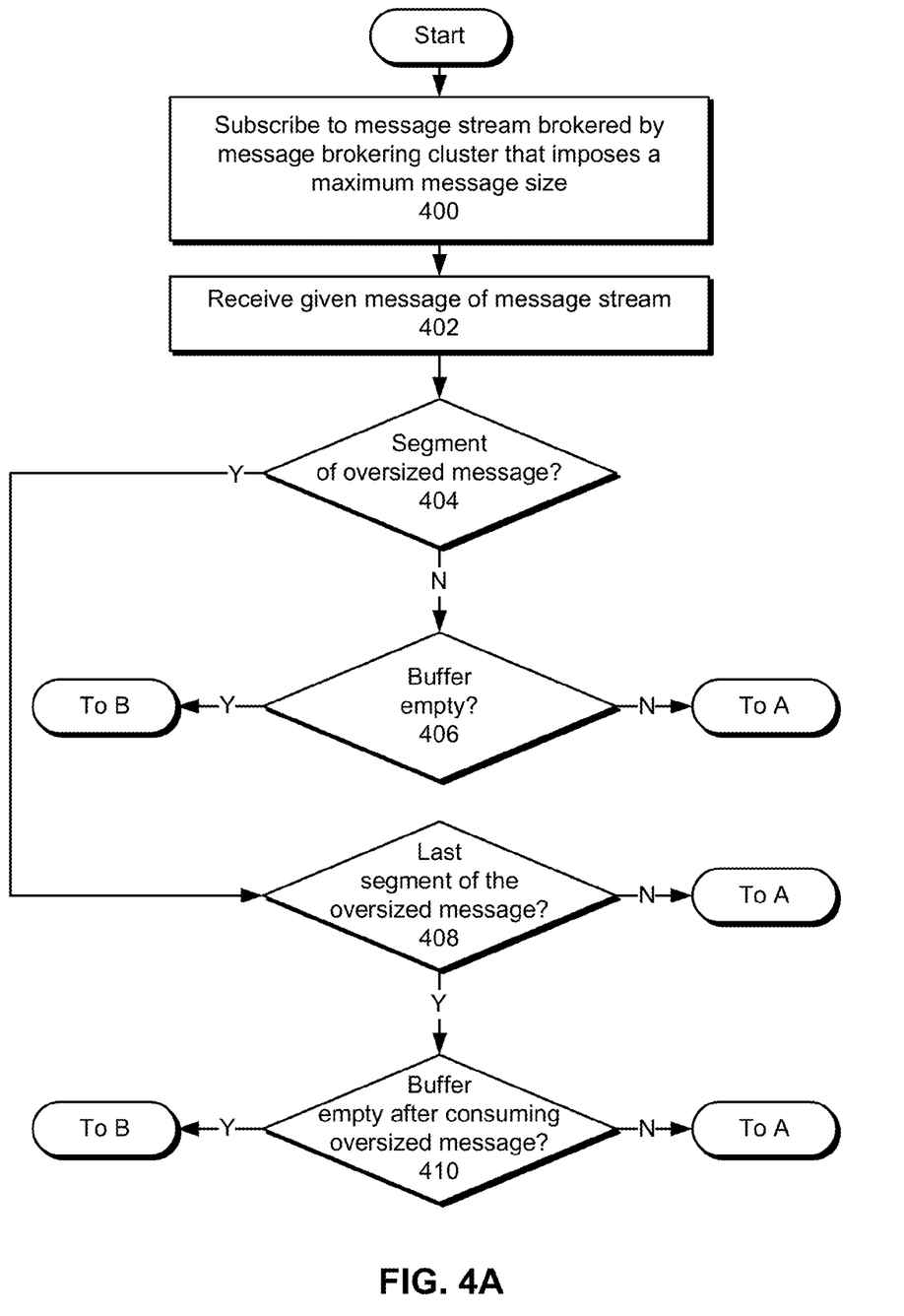
FIGS. 4A-4B show a flowchart illustrating an exemplary process of committing an offset to a message brokering cluster in accordance with the disclosed embodiments.

If the segment is not the last segment of the oversized message, the segment is stored within the oversized message buffer 210 until the last segment is received. For example, segment 4 (offset 117) is received by message consumer 206 as shown in FIG. 4. From the accompanying metadata, the message consumer determines that segment 4 is not the final segment of the message, and so segment 4 is stored in oversized message buffer 210 alongside segments 1, 2, and 3 (i.e., messages 99, 103, and 115). At some future point, when segment 5 (offset 120) is received by message consumer 206, the message consumer will combine the five segments to rebuild oversized message 214, which is then consumed. At that point, the (oversized) message will be known as the message having offset 120, which is the offset assigned to the final segment of the message.

In some embodiments, the producer assigns the unique identifier of the oversized message (e.g., BA12FC18 in FIG. 2) as the segment id for the final segment of the message. The consumer can therefore determine that it has received the final segment of the message when it receives a segment/message in which the segment id matches the message id. In some other embodiments, metadata that accompanies segments of oversized messages identifies the position of the segment among the segments of the same oversized message and the total number of segments for that message, and the consumer can readily determine when it has received the final segment of the oversized message. In yet other embodiments, the consumer uses metadata identifying the size of an oversized message, and the sizes of individual segments of the oversized message, to determine when it has received the full message. In still other embodiments, other techniques may be used to help a consumer determine when it has received all segments of an oversized message.

When a standard message is received (i.e., not a segment of an oversized message) and/or when a particular segment of an oversized message is received by message consumer 206, offset tracker 212 may record metadata pertaining to the message in an entry that is mapped to the particular segment's offset. More specifically, the offset tracker may record a "starting offset" and a "safe offset" of the message, wherein (1) the starting offset is the offset of the first segment of the message (i.e., the offset of the message itself for a standard message), and (2) the safe offset corresponds to the offset of the most recent message that was received when the buffer was empty, the offset of the oldest buffered segment of an oversized message, or some other offset from which consumption of messages should resume after a crash or other failure.

While reading the message stream, message consumer 206 may periodically commit an offset to broker 204 to save the message consumer's place in the message stream. When the message consumer decides to commit an offset in response to receiving a particular message, the message consumer generally commits the offset of the next message that would arrive after the particular message. However, if the oversized message buffer is not empty after the particular message is received (illustratively, if the particular message is a segment of an oversized message and not the last segment, the particular message would be buffered at this point), the message consumer would calculate a safe offset that corresponds to the received message and commit the safe offset. In doing so, if the message consumer crashes immediately afterwards, the message consumer resumes reading messages from the safe offset and is guaranteed not to miss any messages and/or segments. In some embodiments, commits to the message brokering cluster are handled by a consumer record processor module that is contained within the message consumer.

For example, in FIG. 2, after message consumer 206 buffers offset 117 (segment 4 of the oversized message) in oversized message buffer 210, the message consumer may commit offset 99 to broker 204 because the last time oversized message buffer 210 was empty was when the message having offset 99 (segment 1 of the oversized message) was received. If message consumer 206 crashes after committing offset 99 but before receiving offset 120 (segment 5), the message consumer loses all segments of partially received oversized messages, including the first four segments of oversized message 214. Thus, message consumer 206 would restart reading the message stream at offset 99, which means that the message consumer will re-fetch the first four segments of oversized message 214 from the broker.

To ensure that oversized message buffer 210 does not run out of memory, some embodiments may include an expiration mechanism that removes, from the oversized message buffer, segments of oversized messages that are not completed in a reasonable amount of time. For example, if message producer 202 crashes after sending the first 3 segments of oversized message 214 to the broker, the final two segments of the oversized message may not be sent for a long time (e.g., until the hardware for the server on which message producer 202 executed is fixed). After segments 1-3 (message offsets 99, 103, 115) are fetched by message consumer 206 from the broker, the partial message may sit indefinitely in oversized message buffer 210.

Thus, in some embodiments, after the first segment of an oversized message is buffered, if a threshold number of messages are encountered without receiving the last segment of the oversized message (or if a threshold period of time has elapsed since receipt of the first (or most recent) segment), all segments of the partially received message are evicted from the buffer. For example, a message consumer receives the first segment of an oversized message, wherein the first segment has an offset of '15' and the threshold number is 100. If, at a later point, the message consumer receives a message with an offset of 116 and the last segment of the oversized message has not been received, the message consumer evicts all segments of the partially received oversized message from its oversized message buffer, including the first segment, because 116 is greater than 100+15.

Figure 3A:
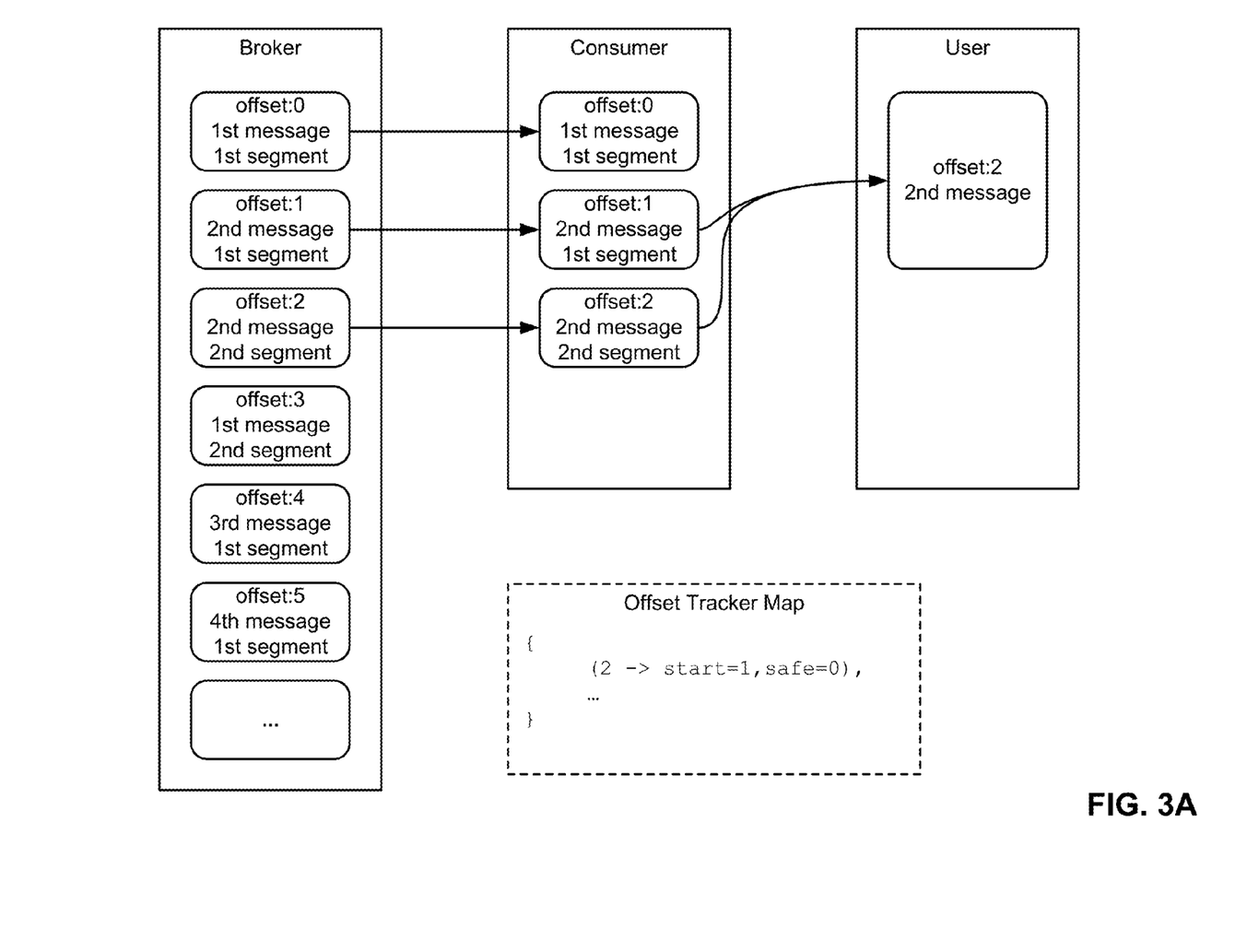
FIGS. 3A-3B show delivery of multiple oversized messages from a broker to a user in accordance with the disclosed embodiments.
Figure 3B:
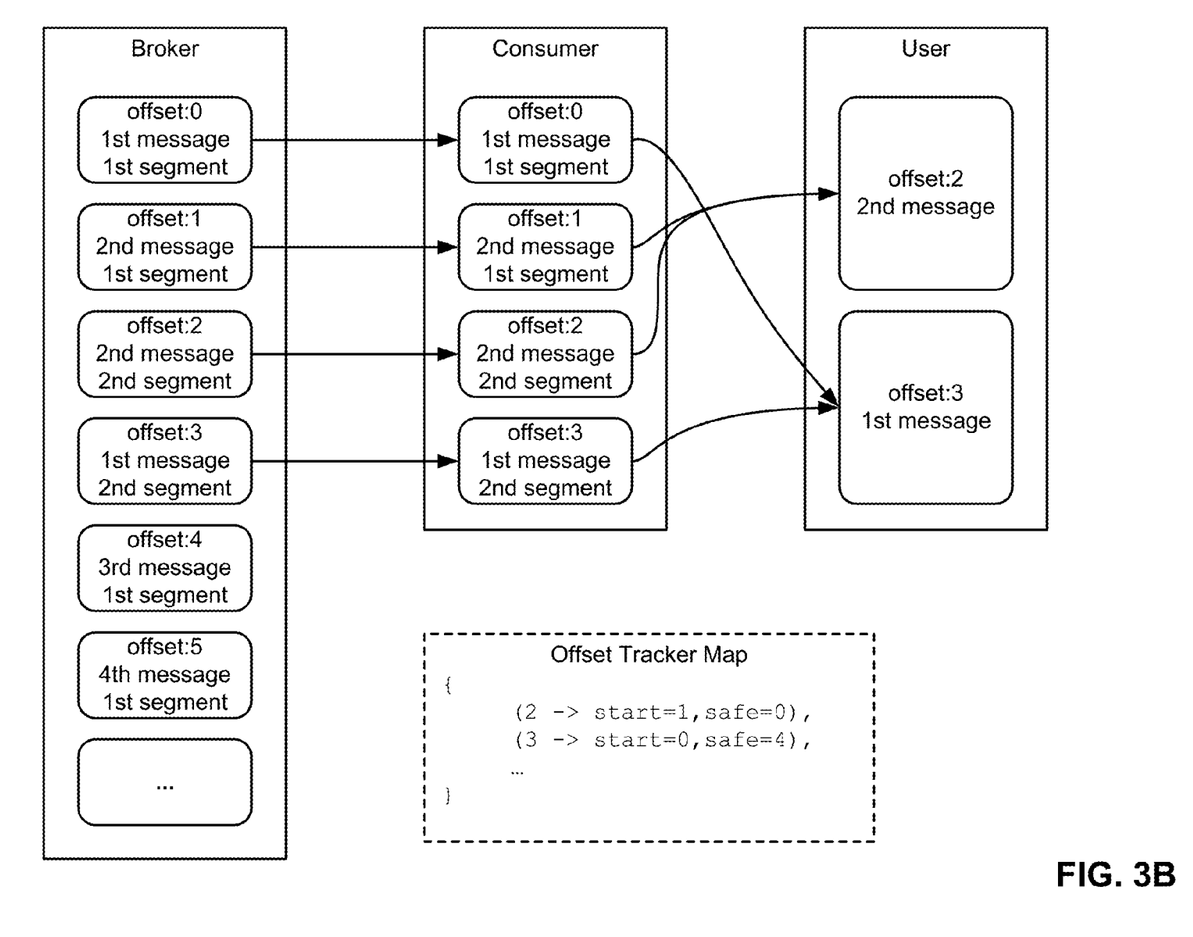

FIGS. 3A-3B show delivery of multiple oversized messages from a broker to a user in accordance with the disclosed embodiments. More specifically, FIGS. 3A-3B illustrate one or more relationships between messages logged by a broker, messages fetched by a consumer, and messages presented by the consumer to a user of the consumer. It should be noted that while all of the messages depicted in the illustrated embodiments are segments of oversized messages, in practice, within a message stream normal-sized messages may be interleaved between segments of oversized messages.

FIG. 3A shows the system after the broker has logged six messages of the message stream and the consumer has fetched the first three of the six logged messages from the broker. In particular, the broker has logged, in the following order: the first segment of a first oversized message, which has been assigned '0' as its message offset; the first segment of a second oversized message, which has been assigned '1' as its offset; the second segment of the second oversized message, which has been assigned '2' as its offset; the second segment of the first oversized message, which has been assigned '3' as its offset; the first segment of a third oversized message, which has been assigned '4' as its offset; and the first segment of a fourth oversized message, which has been assigned '5' as its offset. Meanwhile, the consumer has fetched the first segment of the first oversized message (offset 0), the first segment of the second oversized message (offset 1), and the second segment of the second oversized message (offset 2). It should be noted that the first and second oversized messages each include a total of two segments.

Returning to the point when the consumer first fetches the first segment of the first oversized message from the broker, the consumer determines, from the segment's metadata, that the segment is the first segment of an oversized message that includes a total of two segments. Because the first segment of the first oversized message is not the last segment of an oversized message, the consumer stores the segment in its oversized message buffer. Next, when the consumer fetches the first segment of the second oversized message from the broker, the first segment of the second oversized message is also buffered because it too is not the last segment of an oversized message. When the consumer then fetches the second segment of the second oversized message from the broker, the consumer determines, from the segment's metadata, that the segment is the last segment of the second oversized message because it is the second segment of an oversized message that includes a total of two segments. Next, the consumer retrieves the first segment of the second oversized message from the buffer and combines the two segments of the second oversized message to rebuild the second oversized message. The second message is then presented to the user for consumption, wherein the second oversized message is associated with the offset '2'.

Thus, it should be noted that although the consumer had begun to receive segments of the first oversized message prior to encountering any segments of the second oversized message, because the last segment of the second oversized message was received prior to the last segment of the first oversized message, the user sees the second oversized message first.

In association with delivery of the second oversized message, an offset tracker of the consumer may additionally record an entry that contains starting and safe offsets (shown as "start" and "safe" in FIG. 3A respectively. For the starting offset, the consumer specifies the offset of the first segment of the second message, which is '1'. For the safe offset, because the consumer's buffer still contains the first segment of the first oversized message, the consumer specifies the offset of the earliest or oldest buffered segment, which is '0'. Both the starting offset and the safe offset are mapped to the second oversized message's offset at an entry within the offset tracker map.

The consumer may additionally commit the safe offset of the second oversized message, which is '0', to the broker so that if the consumer crashes immediately after consuming the second message, the consumer will resume reading the message stream from offset '0' and re-fetch all the segments of the first (and second) oversized message. This is necessary because if the consumer were to start at offset '3', which is the offset of the message that arrives after the second oversized message's last segment, the consumer would not receive the first oversized message. Thus, resuming from the offset of the most recent message that was received when the consumer's oversized message buffer was empty guarantees that the consumer does not miss any segments of any oversized message within the message stream.

FIG. 3B shows the system after the consumer has fetched the fourth message from the broker, which has an offset of '3' and is the second segment of the first oversized message in the message stream. When the consumer fetches this segment from the broker, the consumer determines, from the segment's metadata, that the segment is the last segment of the first oversized message because it is the second segment of an oversized message that includes a total of two segments. At this point, the consumer retrieves the first segment of the first oversized message from the buffer and combines the two segments of the first oversized message to rebuild the first oversized message. The first oversized message is assigned an offset of '3' and is presented to the user to consume.

In association with delivery of the first oversized message to the user, the offset tracker of the consumer may record another entry that contains the starting offset and the safe offset associated with the first message. For the starting offset, the consumer specifies the offset of the first segment of the first oversized message, which is '0'. For the safe offset, because the consumer's buffer is now empty, the consumer specifies the offset of the next message that would be fetched from the broker, which is '4'.

The consumer may additionally commit the first oversized message's safe offset to the broker so that if the consumer crashes immediately after consuming the first message, the consumer will resume reading the message stream from offset '4'.

In some embodiments, the consumer may receive, from the user, a request to seek to a particular message in the message stream. Whether the message that is sought is of standard size or is oversized, the consumer seeks to the lower of the safe offset and the starting offset associated with the target message. For example, if the user requests to seek to the second oversized message, the consumer seeks to offset '0', which is the safe offset associated with the second oversized message. If the user requests to seek to the first oversized message, the consumer also seeks to offset '0', which is the starting offset of the first oversized message.

Figure 4B:
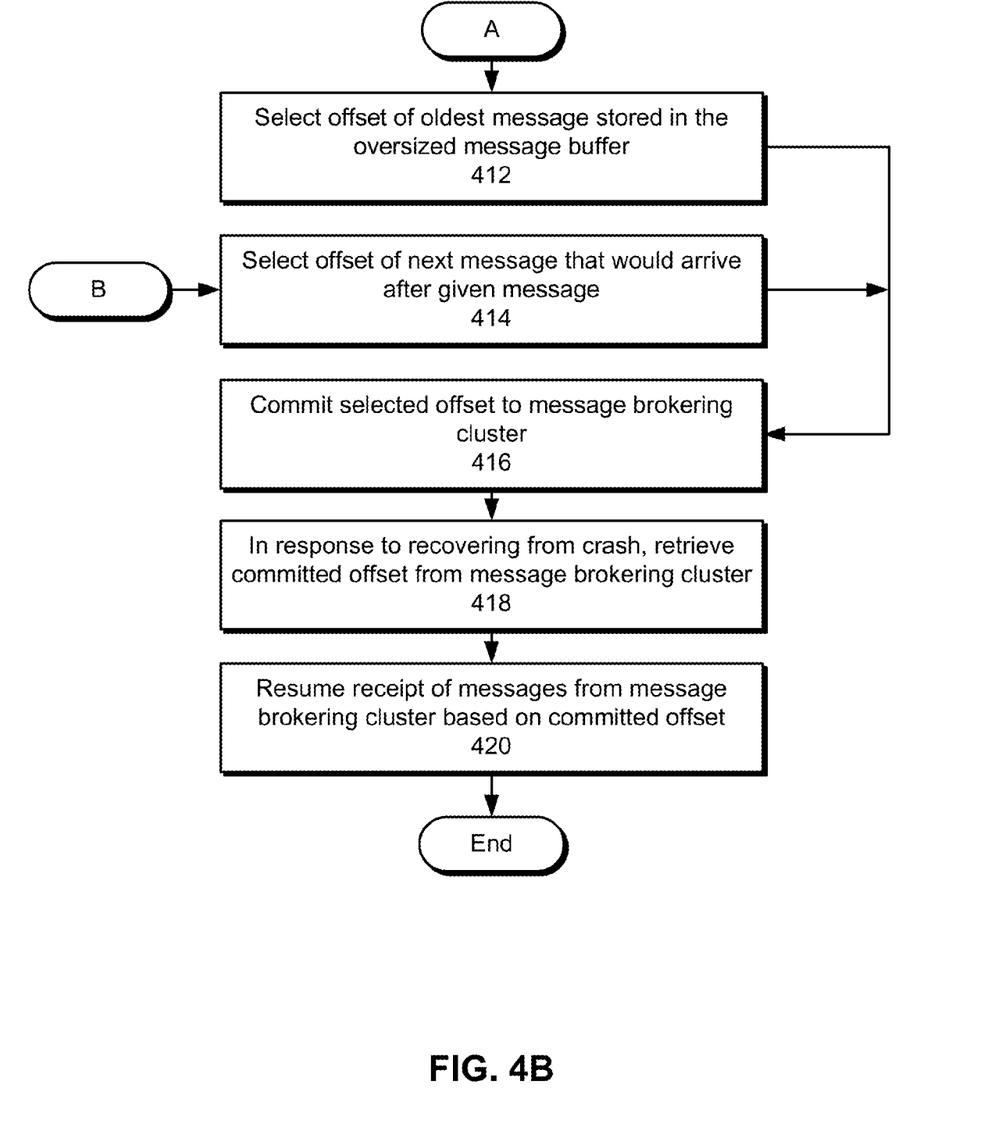

FIGS. 4A-4B show a flowchart illustrating an exemplary process of committing an offset to a message brokering cluster in accordance with the disclosed embodiments. In one or more embodiments, one or more of the steps may be omitted, repeated, and/or performed in a different order. Accordingly, the specific arrangement of steps shown in FIGS. 4A-4B should not be construed as limiting the scope of the embodiments.

Initially, a consumer subscribes to a message stream that is brokered by a message brokering cluster that imposes a maximum message size (operation 400). When the consumer receives a given message of the message stream (operation 402), the consumer determines whether the given message is a segment of an oversized message that has been divided into multiple segments, which are to be sent as individual messages via the message brokering cluster (decision 404).

If the given message is not a segment of an oversized message, the consumer then determines whether the consumer's oversized message buffer is empty (decision 406). If the buffer is not empty (it contains a segment from an oversized message), the consumer selects the offset of the oldest message within the oversized message buffer (operation 412). This offset may be the offset of the most recent message that was received when no segments of any oversized messages were buffered. If the buffer is empty, the consumer selects the offset of the next message that would arrive after the given message (operation 414).

If the given message is a segment of an oversized message, the consumer then determines whether the given message is the last segment of the oversized message (decision 408). If the given message is not the last segment of the oversized message, the consumer selects the offset of the oldest message within the oversized message buffer (operation 412).

If the given message is the last segment of the oversized message, the consumer (1) rebuilds the oversized message from the given message and other segments stored within the oversized message buffer, (2) consumes the message, and (3) determines whether the oversized message buffer is empty after consuming the oversized message (decision 410). If the buffer is empty, the consumer selects the offset of the next message that would arrive after the given message (operation 414). If the buffer is not empty, the consumer selects the offset of the oldest message within the oversized message buffer (operation 412).

After the offset is selected, the consumer commits the selected offset to the message brokering cluster (operation 416).

In response to recovering from a crash that occurs before the next commit, the consumer retrieves the committed offset from the message brokering cluster (operation 418). The consumer then resumes receiving messages from the message stream based on the committed offset (operation 420). In particular, the first message received by the consumer after resuming is the message identified by the committed offset.

Figure 5A:
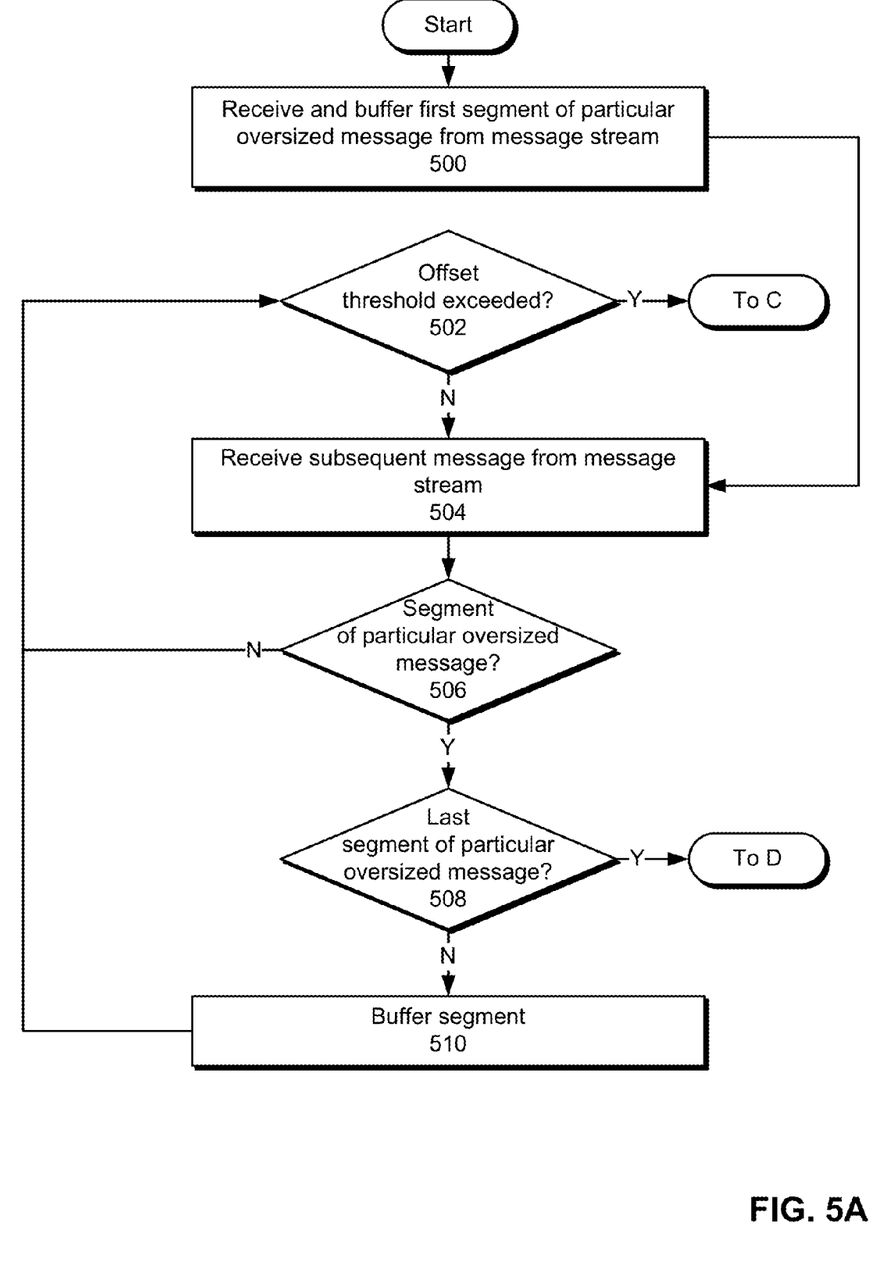
FIGS. 5A-5B show a flowchart illustrating an exemplary process of delivering an oversized message via a message brokering cluster in accordance with the disclosed embodiments.
Figure 5B:
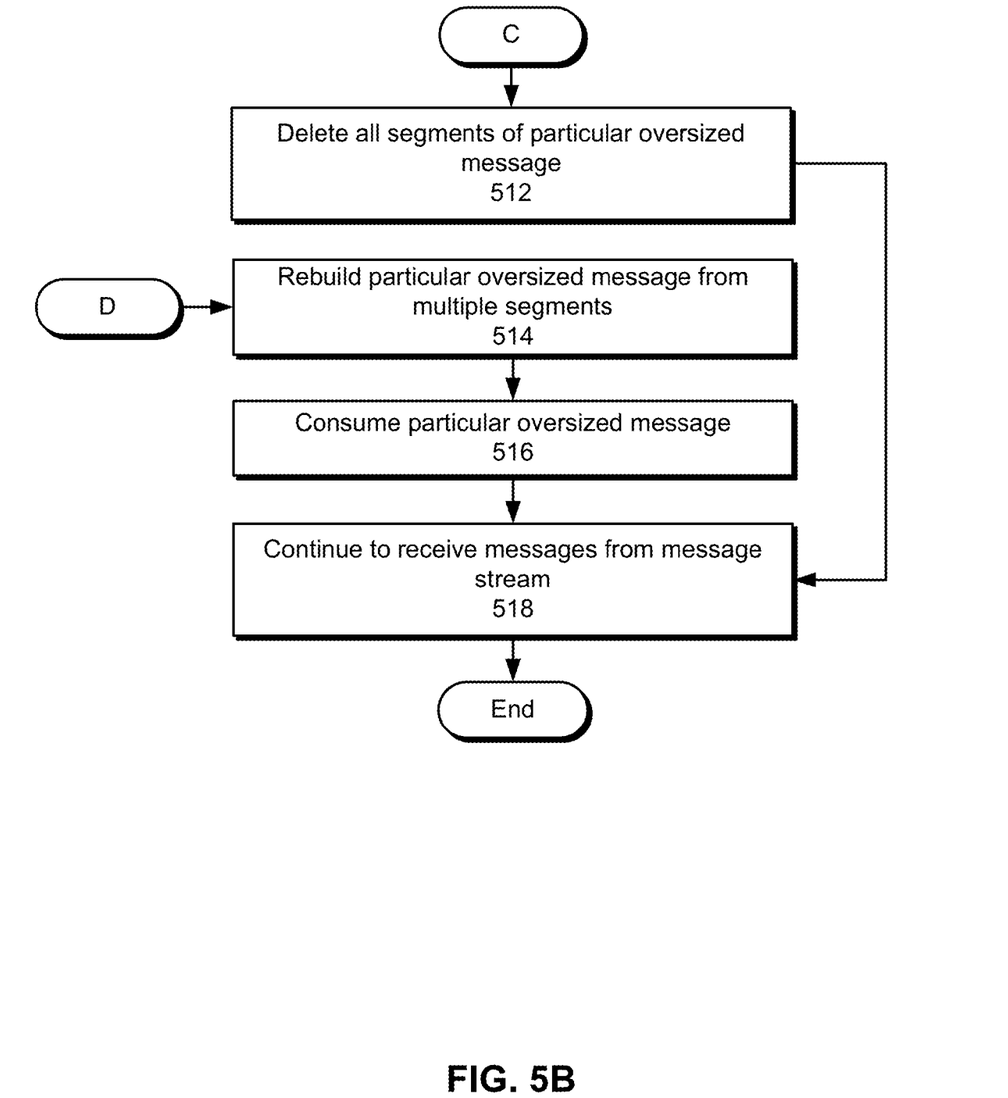

FIGS. 5A-5B show a flowchart illustrating an exemplary process of delivering an oversized message via a message brokering cluster in accordance with the disclosed embodiments. In one or more embodiments, one or more of the steps may be omitted, repeated, and/or performed in a different order. Accordingly, the specific arrangement of steps shown in FIGS. 5A-5B should not be construed as limiting the scope of the embodiments.

Initially, a consumer that is subscribed to a message stream receives and buffers a first segment of a particular oversized message (operation 500). Next, when the consumer receives a subsequent message from the message stream (operation 504), the consumer determines whether the subsequent message is a segment of the particular oversized message (decision 506).

If the subsequent message is not a segment (i.e., the message is a normal-sized message) or the subsequent message is a segment of another oversized message, the consumer processes the message accordingly (not shown in the figure). In particular, if the subsequent message is a normal-sized message, the consumer consumes the message. If the subsequent message is a segment of another oversized message, the consumer either buffers the segment or rebuilds the other oversized message depending on whether the subsequent message is the last segment of the oversized message or not. The consumer then prepares to receive another subsequent message from the message stream.

Before the consumer receives another subsequent message from the message stream, however, the consumer first determines whether the difference between the offset of the first segment of the oversized message and the offset of the most recently received (subsequent) message exceeds a threshold value (decision 502), which would indicate that the particular oversized message has expired. If the threshold value is not exceeded, the consumer continues to receive or fetch another subsequent message (operation 504) from the message stream, until either the last segment of the particular oversized message is received or the threshold value is exceeded.

When a subsequent message is a segment of the particular oversized message, the consumer determines whether it is the last segment of the particular oversized message (decision 508). If the subsequent message is not the last segment, the consumer buffers the given message in its oversized message buffer (operation 510), determines whether the particular oversized message has expired (decision 502) and prepares to receive another subsequent message from the message stream.

If the threshold value is exceeded (in decision 502), the consumer determines that the particular oversized message will not be completed within a reasonable amount of time and deletes from the consumer's oversized message buffer all of the buffered segments of the particular oversized message (operation 512). The consumer then continues to receive messages from the message stream (operation 518).

When a subsequent message is the last segment of the particular oversized message, the consumer rebuilds the particular oversized message from the last segment and other segments buffered within the oversized message buffer (operation 514) and consumes the particular oversized message (operation 516). The consumer then continues to receive messages from the message stream (operation 518).

Figure 6:
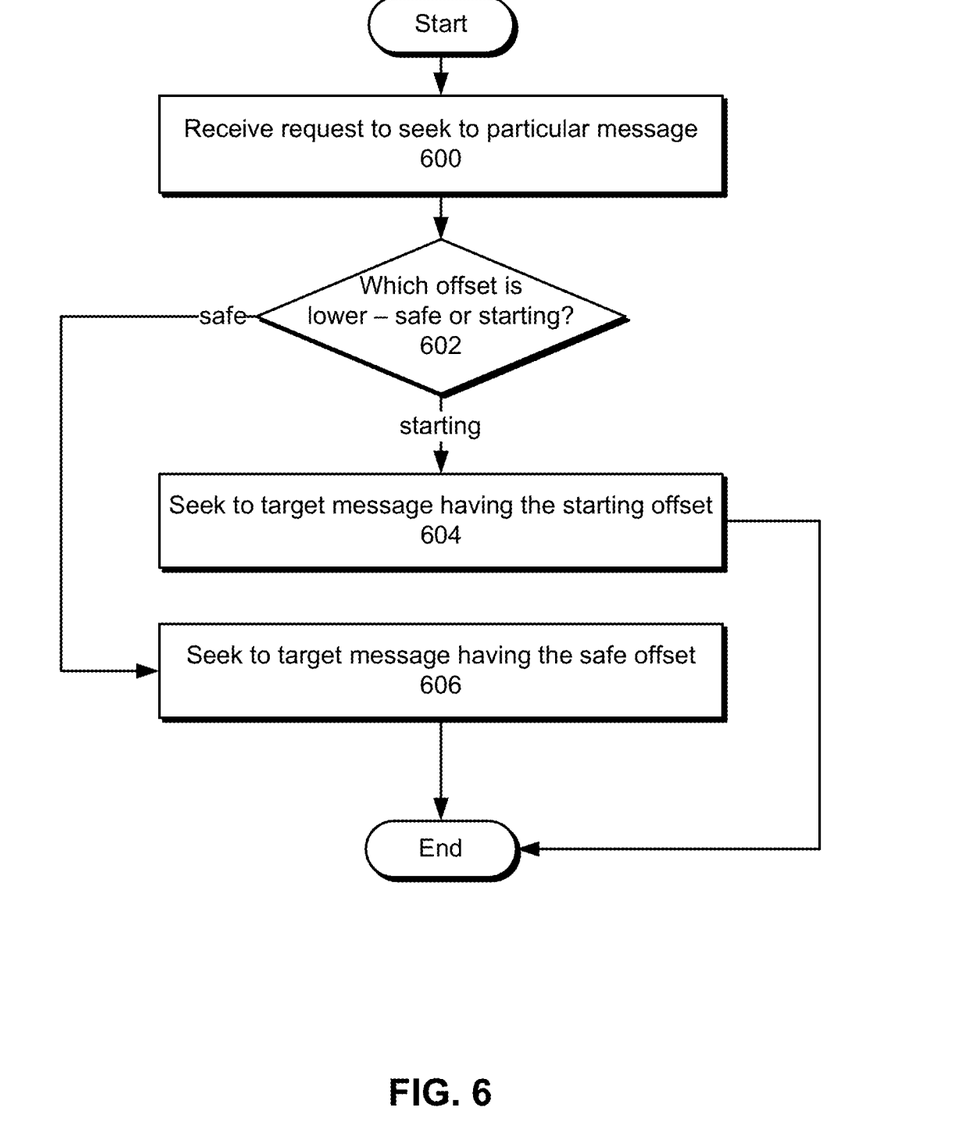
FIG. 6 shows a flowchart illustrating an exemplary process of seeking to an offset within a message stream in accordance with the disclosed embodiments.

FIG. 6 shows a flowchart illustrating an exemplary process of seeking to an offset within a message stream in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

Initially, a consumer subscribes to a message stream that is brokered by a message brokering cluster that imposes a maximum message size. In response to receiving (e.g., from a user) a request to seek to a particular message in the stream (operation 600), the consumer examines the starting offset and the safe offset associated with the specified message (e.g., within an offset tracker map), identifies the lower offset (operation 602), and seeks to the message having that offset within the message stream (operation 604, operation 606). The consumer then resumes reading the message stream starting with the corresponding message.

Figure 7:
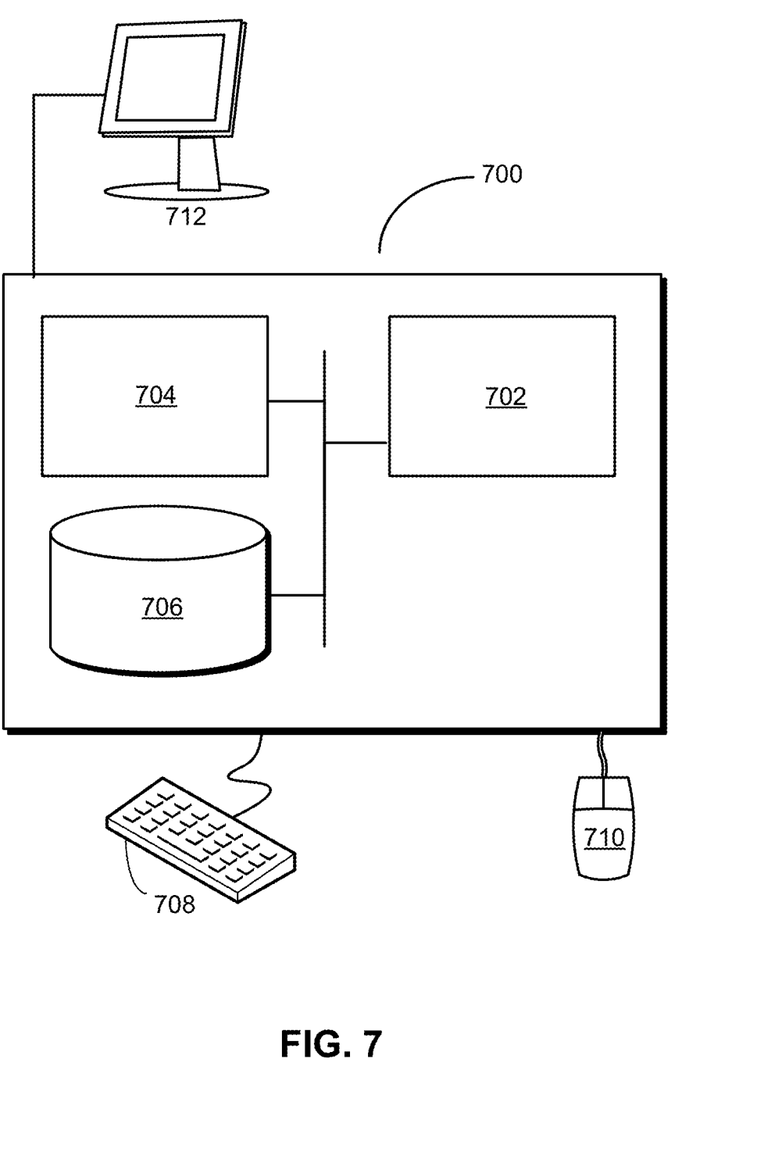
FIG. 7 shows a computer system in accordance with the disclosed embodiments.

FIG. 7 shows a computer system 700 in accordance with an embodiment. Computer system 700 may correspond to an apparatus that includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system that supports the passing of oversized messages within a publish-subscribe messaging system. The system may include a message producing module and/or apparatus that transfers oversized messages over a message stream by dividing the oversized messages into multiple segments and publishing the segments as individual messages to the message stream, a message brokering module and/or apparatus that brokers the message stream and imposes a maximum message size upon the stream, and a message consuming apparatus that subscribes to the message stream and receives the published segments of the oversized messages.

In addition, one or more components of computer system 700 may be remotely located and connected to the other components over a network. Portions of the present embodiments (e.g., application apparatus, controller apparatus, data processing apparatus, etc.) may also be located on different nodes of a distributed system that implements the embodiments. For example, the present embodiments may be implemented using a cloud computing system that supports the passing of oversized messages within a publish-subscribe messaging system.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    subscribing to a message stream brokered by a message brokering cluster that imposes a maximum message size, wherein messages in the message stream are identified by offsets assigned in accordance with an order of the messages;
    responsive to receiving a given message of the message stream:
        determining an offset to commit to the message brokering cluster, wherein the determined offset is based on whether one or more segments of one or more oversized messages are buffered; and
        committing the determined offset to the message brokering cluster;
    responsive to recovering from a crash, wherein the offset at which to resume the receipt of messages from the message stream is unknown, retrieving the determined offset from the message brokering cluster; and
    resuming the receipt of messages from the message brokering cluster based on the determined offset;
    wherein each of the one or more oversized messages has been divided into multiple segments and each of the multiple segments is sent as an individual message that complies with the maximum message size.

2. The method of claim 1, wherein determining the offset to commit to the message brokering cluster comprises:
    when the given message is a segment of a first oversized message:
        when the given segment is the last segment of the first oversized message:
            when at least one segment of another oversized message is buffered when the given message is received, selecting the offset of the oldest message that is buffered; and
            when no segment of another oversized message is buffered when the given message is received, selecting the offset of a subsequent message; and
        when the given segment is not the last segment of the first oversized message, selecting the offset of the oldest message that is buffered; and
    when the given message is not a segment of an oversized message:
        when at least one segment of an oversized message is buffered when the given message is received, selecting the offset of the oldest message that is buffered; and
        when no segments of any oversized messages are buffered when the given message is received, selecting the offset of the subsequent message.

3. The method of claim 1, further comprising, when the given message is a segment of a first oversized message and is not the last segment of the first oversized message:
    buffering the given message; and
    when the last segment of the first oversized message is received, rebuilding the first oversized message from the multiple segments and consuming the first oversized message.

4. The method of claim 3, further comprising, when the given message is an initial segment of the first oversized message:
    responsive to receiving a subsequent message, when a difference between the subsequent message's offset and the given message's offset exceeds a threshold value, deleting all buffered segments of the first oversized message, including the initial segment.

5. The method of claim 3, wherein the first oversized message's offset is defined to be equal to the last segment's offset.

6. The method of claim 3, wherein each of the segments of the first oversized message further comprises a segment identifier and a size of the first oversized message.

7. The method of claim 1, further comprising:
    recording a safe offset and a starting offset corresponding to the given message; and
    responsive to receiving a request to seek to the given message's offset:
        identifying a lower offset between the safe offset and the starting offset; and
        seeking to a message corresponding to the lower offset.

8. The method of claim 1, wherein:
    the message brokering cluster corresponds to a Kafka cluster; and
    the message stream corresponds to one of a Kafka topic and one or more partitions of a Kafka topic.

9. The method of claim 1, wherein each message comprises data formatted in one of:
    JavaScript Object Notation; and
    Avro.

10. An apparatus, comprising:
    one or more processors; and
    memory storing instructions that, when executed by the one or more processors, cause the apparatus to:
        subscribe to a message stream brokered by a message brokering cluster that imposes a maximum message size, wherein messages in the message stream are identified by offsets assigned in accordance with an order of the messages;
        responsive to receiving a given message of the message stream:
            determine an offset to commit to the message brokering cluster, wherein the determined offset is based on whether one or more segments of one or more oversized messages are buffered; and commit the determined offset to the message brokering cluster;

responsive to recovering from a crash, wherein the offset at which to resume the receipt of messages from the message stream is unknown, retrieve the determined offset from the message brokering cluster; and resume the receipt of messages from the message brokering cluster based on the determined offset;

wherein each of the one or more oversized messages has been divided into multiple segments and each of the multiple segments is sent as an individual message that complies with the maximum message size.

11. The apparatus of claim 10, wherein determining the offset to commit to the message brokering cluster comprises:

when the given message is a segment of a first oversized message:
when the given segment is the last segment of the first oversized message:
when at least one segment of another oversized message is buffered when the given message is received, selecting the offset of the oldest message that is buffered; and
when no segment of another oversized message is buffered when the given message is received, selecting the offset of a subsequent message; and
when the given segment is not the last segment of the first oversized message, selecting the offset of the oldest message that is buffered; and when the given message is not a segment of an oversized message:
when at least one segment of an oversized message is buffered when the given message is received, selecting the offset of the oldest message that is buffered; and
when no segments of any oversized messages are buffered when the given message is received, selecting the offset of the subsequent message.

12. The apparatus of claim 10, wherein the apparatus is further caused to, when the given message is a segment of a first oversized message and is not the last segment of the first oversized message:

buffer the given message; and
when the last segment of the first oversized message is received, rebuild the first oversized message from the multiple segments and consume the first oversized message.

13. The apparatus of claim 12, wherein the apparatus is further caused to, when the given message is an initial segment of the first oversized message:

responsive to receiving a subsequent message, when a difference between the subsequent message's offset and the given message's offset exceeds a threshold value, delete all buffered segments of the first oversized message, including the initial segment.

14. The apparatus of claim 12, wherein the first oversized message's offset is defined to be equal to the last segment's offset.

15. The apparatus of claim 12, wherein each of the segments of the first oversized message further comprises a segment identifier and a size of the first oversized message.

16. The apparatus of claim 10, wherein the apparatus is further caused to:

record a safe offset and a starting offset corresponding to the given message; and responsive to receiving a request to seek to the given message's offset:
identify a lower offset between the safe offset and the starting offset; and
seek to a message corresponding to the lower offset.

17. The apparatus of claim 10, wherein:
the message brokering cluster corresponds to a Kafka cluster; and
the message stream corresponds to one of a Kafka topic and one or more partitions of a Kafka topic.

18. The apparatus of claim 10, wherein each message comprises data formatted in one of:
JavaScript Object Notation; and
Avro.

19. A system, comprising:
one or more processors;
a message brokering module comprising a non-transitory computer-readable medium storing instructions that, when executed, cause the system to broker a message stream and impose a maximum message size on the message stream, wherein messages in the message stream are identified by offsets assigned in accordance with an order of the messages; and
a message consuming module comprising a non-transitory computer-readable medium storing instructions that, when executed, cause the system to:
responsive to receiving a given message of the message stream:
determine an offset to commit to a message brokering cluster, wherein the determined offset is based on whether one or more segments of one or more oversized messages are buffered; and
commit the determined offset to the message brokering cluster;
responsive to recovering from a crash, wherein the offset at which to resume the receipt of messages from the message stream is unknown, retrieve the determined offset from the message brokering cluster; and
resume the receipt of messages from the message brokering cluster based on the determined offset;
wherein each of the one or more oversized messages has been divided into multiple segments and each of the multiple segments is sent as an individual message that complies with the maximum message size.

20. The system of claim 19, wherein determining the offset to commit to the message brokering cluster comprises:
when the given message is a segment of a first oversized message:
when the given segment is the last segment of the first oversized message:
when at least one segment of another oversized message is buffered when the given message is received, selecting the offset of the oldest message that is buffered; and
when no segment of another oversized message is buffered when the given message is received, selecting the offset of a subsequent message; and
when the given segment is not the last segment of the first oversized message, selecting the offset of the oldest message that is buffered; and
when the given message is not a segment of an oversized message:
when at least one segment of an oversized message is buffered when the given message is received, selecting the offset of the oldest message that is buffered; and when no segments of any oversized messages are buffered when the given message is received, selecting the offset of the subsequent message.

\* \* \* \* \*